April 9, 1963 F. L. DIETERICH 3,084,618
FOOD HOLDER
Filed Nov. 9, 1959 2 Sheets-Sheet 1
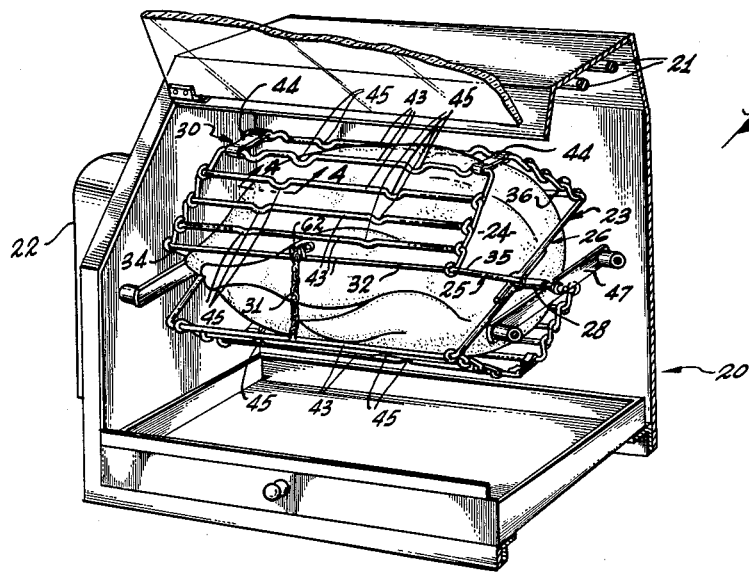
Fig.1
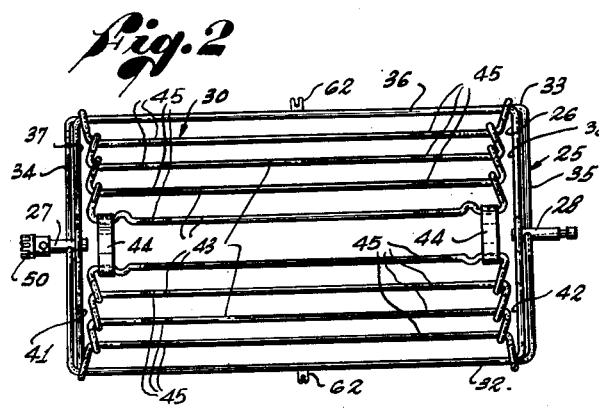
Fig.2
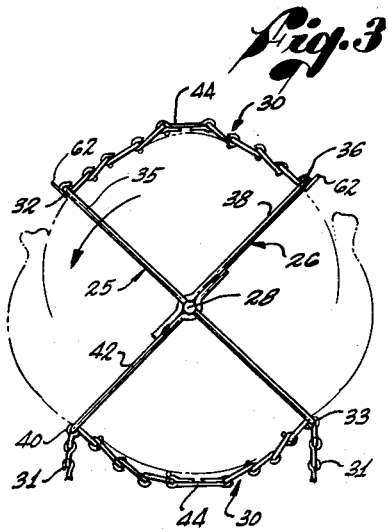
Fig.3
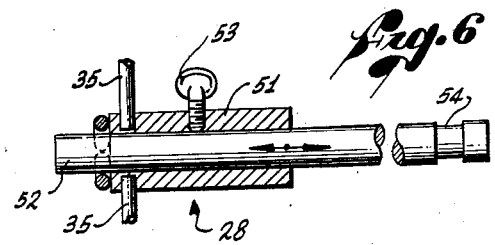
Fig.4
Fig.5
Fig.6
INVENTOR.
FRANCIS L. DIETERICH
BY
ATTORNEYS

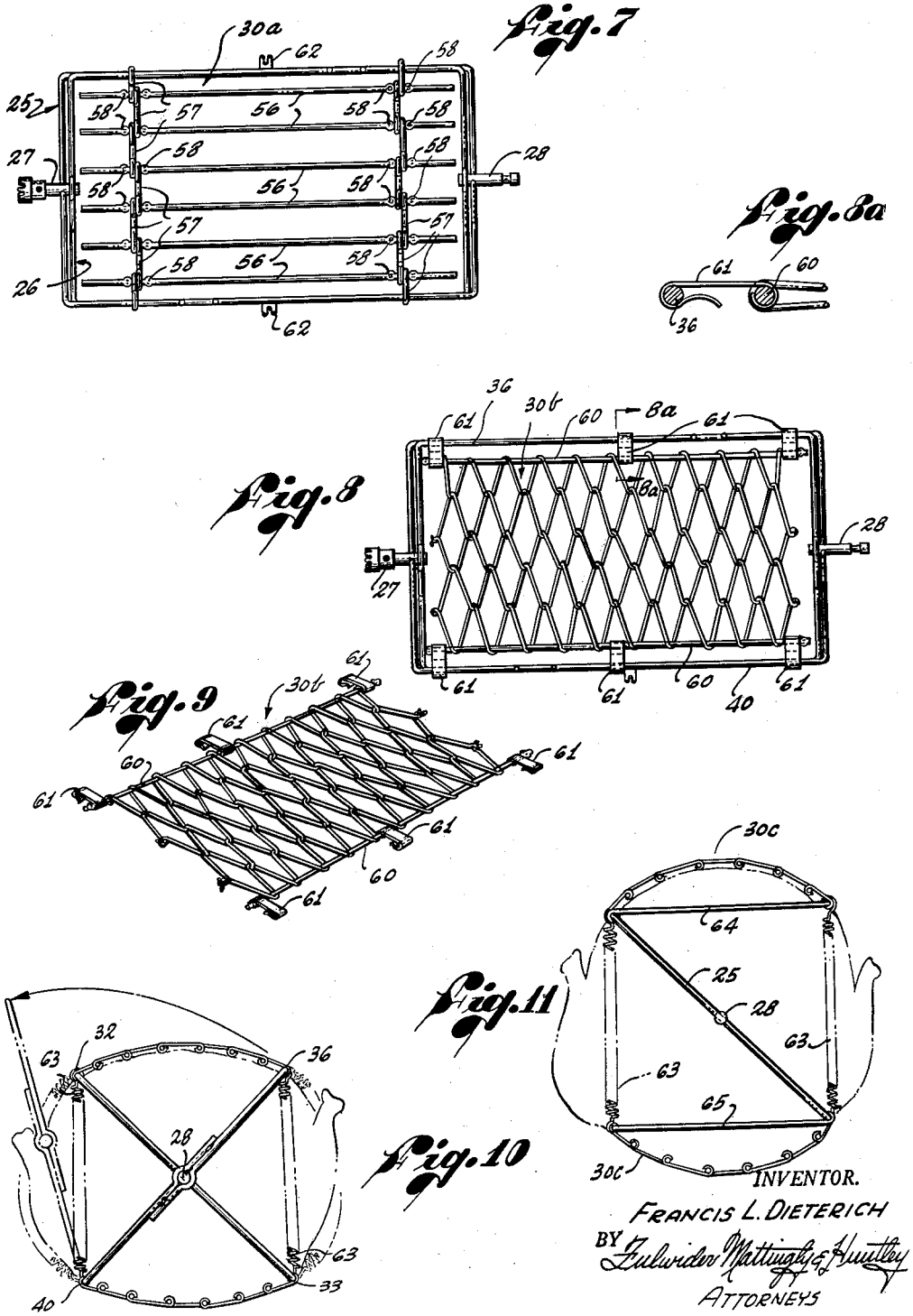

United States Patent Office 3,084,618
Patented Apr. 9, 1963

3,084,618
FOOD HOLDER
Francis L. Dieterich, 3731 S. Robertson Blvd.,
Culver City, Calif.
Filed Nov. 9, 1959, Ser. No. 851,617
6 Claims. (Cl. 99—427)

This invention relates generally to rotisserie cooking, and more particularly to a grip or clamp for holding food while it is being turned before the heat, as if it were on a spit.

As people have become more familiar with barbecue and related forms of cooking, they have become more aware of the advantages of spit cooking. In this method of cooking, the food is impaled upon a spit and is then slowly rotated before a source of heat, which may be a bed of coals, a wall of glowing charcoal, or an electric heating element. More recently, ovens have been built having provision for receiving and turning one or more spits so that the advantages of spit cooking may easily be enjoyed by many.

However, while there are many desirable features of the final product, there are often difficulties in practicing the spit cooking. Thus, in order to secure the desired uniformity of motion and a generally uniform distance from the source of heat, it is desirable for the spit to pass substantially through the center of gravity of the food, and to hold the food in this position. In the case of some foods, cavities or other irregularities in the distribution of the food may make it very difficult for a spit to be held at the center of gravity of the food. In such cases, the food should be rotated about an axis that is centered with respect to the external surface of the food. Once again, of course, the food should be firmly held with respect to this axis.

It is often difficult to impale the article of food upon a spit, and this is particularly true in the case of foods, such as meats, that may be frozen, and the piercing of the food permits juices to drip, losing much flavor and frequently resulting in a food that is dryer than it should be.

With the foregoing in mind, it is a major object of my invention to provide an improved means for holding food as it is rotated before a source of heat.

Another object of my invention is to provide such a holding means that does not require the piercing of the food.

It is a further object of my invention to provide a holding means of this type that acts to center the food about the axis of rotation and to hold it in that position without movement with respect to the axis.

Still another object of my invention is to provide a food holder having a gripping or clamping action and is adjustable to securely hold food in a flat shape, such as thin steaks or chops, as well as holding thicker forms, such as turkeys as large as twenty pounds or so.

It is a still further object of my invention to provide such a food holder that may be easily and simply used by people having no previous training in its use.

Additionally, it is an object of my invention to provide such a holding means that is easily cleaned and provides a sanitary cooking device.

Likewise, it is an object of my invention to provide such a holder that can be readily fabricated at a low cost so that the advantages of this form of cooking will be available to more people.

These and other objects and advantages of my invention will become apparent from the following description of preferred and modified forms thereof, and from the drawings illustrating those forms in which:

FIGURE 1 is a perspective view of my preferred form of food-gripping means as it would appear when holding a turkey that is being roasted within an electric rotary cooker, the latter being shown partially broken way;

FIGURE 2 is a plan view of the holding means shown in FIGURE 1;

FIGURE 3 is an end elevational view of the preferred form of holder;

FIGURE 4 is a fragmentary detail of one of the holding rods, to an enlarged scale, taken on the line 4—4 of FIGURE 1, to show the food-securing means;

FIGURE 5 is a view similar to FIGURE 4 but showing an optional form of food-securing means;

FIGURE 6 is a cross-sectional view of an optional form of stub shaft and coupling used to support one end of the holding means;

FIGURE 7 is a view similar to FIGURE 2 and showing an optional form of construction;

FIGURE 8 is a view, similar to FIGURE 2, of a modified form of construction using a chain link type of food-engaging means;

FIGURE 8a is a detailed view, taken on the line 8a of FIGURE 8, showing the clip that may be used to hold the chain link means to the frame;

FIGURE 9 is a perspective view of the chain link food-engaging means of FIGURE 8 as it appears when removed from the frames;

FIGURE 10 is an end elevational view of a modified form of holder showing the use of spring means to urge the frames together; and FIGURE 11 is an end elevational view of another alternate form of construction in which only a single axially mounted frame is used.

Referring now to the drawings and particularly to FIGURE 1 thereof, the numeral 20 indicates generally a rotary cooker, here shown as having heating elements 21 and provided with driving means 22 adapted to rotate a spit or other form of food holder. At the outset, it should be understood that the cooker 20 need not be provided with electric heating elements nor with a motor drive, but instead may take the form of a pit, a charcoal brazier, an oven, or any other suitable cooking means in which a pit may be located and turned, either by hand or by some other driving means.

Located within the cooker 20 and taking the place of the conventional spit is my improved food holder 23 here shown as gripping a turkey or other large fowl 24.

Essentially, my improved food holder includes a pair of frames 25 and 26 rotatably mounted with respect to each other upon a pair of axially aligned stub shafts 27 and 28. Extending between the sides of the frames 25 and 26 are food-engaging means that generally take the form of a flexible grillwork or mesh 30. These food-engaging means 30 are on opposite sides of the holder 23 and clamp or grip the food between them when the frames 25 and 26 are rotated to stretch or tighten the food-engaging means. A chain 31 or other suitable locking means holds the frames 25 and 26 and the food-engaging means in their gripping positions.

With the food 24 thus held by the food holder 23, the two act essentially as a single unit, and may be rotated about the axis of the stub shafts 27 and 28. The external gripping thus securely holds the food 24, and no piercing of the latter, with the consequent escape of juices, is necessary. Additionally, as will be appreciated by those who have attempted to spit a fowl, the food 24 is securely held in position and does not move with respect to its axis of rotation, a condition that is very difficult to secure with a spit that must pass through the visceral cavity, leaving little or nothing to prevent the fowl from moving or "flopping" as the spit is turned. Furthermore, it will be seen that the pivoting action between the frames 25 and 26 acts as an automatic centering means to center the food 24 about the axis of the stub shafts 27 and 28 so that the center of gravity of the food is closely, if not exactly, aligned with the axis of rotation. These features mean that less power is required to rotate the food 24 at a uniform speed, and more uniform cooking is assured.

Considering the construction of the food holder 23 in somewhat greater detail, it will be seen that the frame 25 consists essentially of a rod-like member that is bent to form a rectangular frame having sides 32 and 33 and ends 34 and 35. Coaxial stub shafts 27 and 28 are anchored in the centers of the ends 34 and 35, and project outwardly therefrom to engage suitable driving and supporting means. While there are no particular requirements as to size, the frame 25 should be made of a material having a suitable strength for the weight of the food to be carried, and by way of example, if the frame 25 is approximately ten inches wide and fifteen inches long, it may be called upon to support food weighing in the neighborhood of twenty-five to thirty pounds, and hence should be made of a material, such as a 3/16 inch rod, that will support such a weight. The stub shafts 27 and 28 are correspondingly designed, as is the frame 26 and the flexible grillwork or mesh constituting the food-engaging means 30.

The frame 26 is substantially the same width as the frame 25 just described, but is slightly shorter so that it may fit within the frame 25 and be pivotally attached to the stub shafts 27 and 28. One simple way of accomplishing this is to form the frame 26 of two separate U-shaped rods whose ends are overlapped, the overlapped portions being separated in the center to pass around the inwardly projecting ends of the stub shafts 27 and 28. Thus, the frame 26 is formed of a first rod member forming a side 36, with end portions 37 and 38 projecting toward the stub shafts 27 and 28, in a direction generally parallel to the ends 34 and 35 of the frame 25. The other side 40 of the frame 26 is formed of a similar rod member having ends 41 and 42 that meet and overlap the ends 37 and 38, respectively, as previously described and as best seen in FIGURE 3. In this manner the frame 26 is rotatably mounted upon the stub shafts 27 and 28, and by springing the ends of the frame 26 inwardly, the frame may be removed from the stub shafts, for a purpose hereinafter described.

The food-engaging means 30 may take different forms, but one of the simplest and most practical is shown in FIGURES 1 through 3. In this form, a flexible grillwork is provided by a series of spaced parallel bars extending parallel to the axis of rotation and pivotally connected to each other and to the frames 25 and 26. Thus, the grillwork forming the food-engaging means 30 may be formed of a plurality of rod-like members 43 that extend parallel to the axis of rotation as defined by the stub shafts 27 and 28, and also parallel to the sides 32 and 33 of the frame 25 and sides 36 and 40 of the frame 26. At its ends, each of the rods 43 is bent to engage the next outer bar or framework, the end of the bar being bent over the adjacent bar and then back on itself to form an eye, as best illustrated in FIGURE 1. In this way, the flexibility necessary to conform to the shape of the particular food 24 is achieved.

The two innermost rods 43 are separated a slightly greater distance from each other, and are preferably held together by a pair of straps 44 whose ends are bent over the rods and back upon the straps, as illustrated in FIGURE 3, to hold the two sides of the grillwork together. In this way, the desired flexibility of the grillwork 30 is retained, and the wider space between the innermost bars 43 permits the breastbone of a fowl to project out beyond the grillwork, as indicated in FIGURE 1, without any longitudinally or transversely extending members interfering with this breastbone.

While the frames 25 and 26, together with the flexible grillwork 30 provide a resilient gripping of the food 24, it is desirable to have additional food-securing means. Thus, as meat is cooked, it tends to shrink, while the bones retain their same size. If several small chickens, for example, are placed side by side in the food holder 23, they may be so positioned that the carcass or bone structure of one of them is the principal item against which the flexible grillwork 30 bears. If the other chickens are turned somewhat differently, as their bulk shrinks, they may tend to slide with respect to the food holder 23, a condition that is to be avoided. Consequently, I prefer to include additional food-securing means such as may be provided by projections formed in the rods 43. The simplest form of projection may be produced by bending the rod to form a "bump" or offset 45 as shown in FIGURES 1 and 4, though if desired, blunt pins 46, as shown in FIGURE 5, may be anchored to the rods 43. In either case, the projection is to aid in gripping the food 24 to prevent its movement with respect to the food holder 23, while avoiding puncturing or piercing of the food, as sharp spikes would do.

Rotary cookers, whether they are of the charcoal brazier type, the usual oven, or the special electric cooker, have different distances between the supports for the customary spit. One end of the spit is usually noncircular, such as square, and is intended to fit into a coupling (not shown) that is rotated by the drive means 22. The other end of the spit may be grooved to provide a pair of shoulders that bear against opposite sides of a supporting means, such as the bar 47 of the cooker 20. With such a construction, the groove and bar act to prevent axial movement of the spit and thus ensure the continued support and driving of the spit.

This form of retaining means, which is widely used, requires that the groove be rather accurately positioned from the opposite end of the spit, and a 22-inch spit clearly can not be used in place of a 20-inch spit, or in place of a 24-inch spit. The same requirements apply to the present food holder, which is intended to replace the conventional spit. Since the food holder 23, excluding the stub shafts 27 and 28, is conveniently made in one size, it is desirable to make the stub shafts either replaceable or adjustable, to fit the requirements of the particular cooker. There are comparatively few differences in the different couplings into which the stub shaft 27 fits to be rotated by the drive means 22, the vast majority of said couplings being adapted to receive a square shaft of one of three sizes. Consequently, without too much duplication, a series of food holders 23 may be made having the different size stub shafts 27 that are required. Some cookers use a different type of coupling, and one such form, which is illustrated in FIGURE 2, is a jaw-type coupling or connector somewhat similar to a crown gear. Such a coupling, designated by the numeral 50, in FIGURE 2, is preferably connected to a stub shaft by welding, a set screw, or other suitable means. If the stub shaft 27 is to be made noncircular, as to fit into a drive coupling having a square aperture, the end of the stub shaft may be cut to provide the desired square shape.

For convenience in manufacturing, it is usually desirable to connect the frame 25 to the stub shaft 27 by forming a hole through the stub shaft through which the end of the frame is passed. The stub shaft 27 may then be welded or otherwise suitably held in the desired position, and positive driving connection is thus established to the frame 25.

At the opposite end of the holder 23, the stub shaft 28 may be formed to the precise length desired as shown, for example, in FIGURES 1 and 2, or a hub may be provided through which a stub shaft or axle is passed as shown in FIGURE 6. In the form of hub and axle construction indicated in FIGURE 6, it will be seen that the end 35 of the frame 25 is mounted in a hub 51 that, in the form shown, is generally similar to a sleeve. Axially slidable within the sleeve is a rod 52 that forms the axle cooperating with the hub 51. A set screw 53 permits the axle to be moved with respect to the hub 51 so that the end groove 54 of the stub shaft 28 is properly located, and then retained in position. This construction, it will be recognized, requires that the axle 52 be of a sufficient length to adjust to most of the common cookers, and in some instances, instead of providing an adjustable axle, it is preferable to provide interchangeable axles, each being adapted to provide spacing for a particular cooker. Once the proper axle has been selected, it may be held in position by any suitable means.

It will be recalled that the frame 26 is rotatable about the stub shafts 27 and 28, to pivot with respect to the frame 25. In this way, the frames 25 and 26 are pivotally connected in the manner of scissors, and by moving the upper forward side 32, as seen in FIGURE 1, of frame 25 toward the upper rear side 36 of frame 26, the flexible grillwork 30 is loosened, and the opening between the upper and lower forward sides of the frames is increased. In this position, it is a simple matter to insert the food 24 into the space between the upper and lower flexible grillworks 30, and to move the upper and lower forward sides together, thus pivoting the frames 25 and 26 so that the grillworks grip the food between them. Under certain circumstances, it may be preferable to secure the maximum possible opening, this generally being desired when a relatively large article of food, such as a turkey, has been cooked and is ready to be removed from the holder 23. To secure this maximum opening, the ends of the inner frame 26 may be bowed inwardly slightly to be disengaged from the inner ends of the stub shafts 27 and 28, and when this has been done, the frame 26 may be pivoted about its lower rear side 40, permitting the upper flexible grillwork, in effect, to be rolled back from the food 24. This general form of operation is indicated in FIGURE 10.

It will be appreciated that in addition to the particular form of grillwork 30 that is illustrated in FIGURES 1, 2, and 3, other forms may be used. Thus, as illustrated in FIGURE 7, the frames 25 and 26 are connected together by the stub shafts 27 and 28, as previously described, but a flexible grillwork 30a is provided that is somewhat different from that previously described. Thus, to form the grillwork 30a, a series of axially extending parallel rods 56 are provided, these rods being held together by links 57 that extend between adjacent rods, and between the sides of the frames and the adjacent rods. The links 57 may be simple links formed of a rod-like material that are bent around a rod to form an eye, with the other end of the link being similarly bent around an adjacent rod to form another eye. The links 57 may be retained in position by flattened portions 58 that are formed on the rods 56 adjacent the links.

Still another form of grillwork is indicated in FIGURES 8 and 9, where a chain link form of construction is used to provide a mesh 30b corresponding to the grillwork 30 of the first described form. The chain link form of construction is well known in the fence art, and consists of a generally zigzag-shaped rod or wire whose vertices engage and are engaged by similar vertices of another similarly shaped rod or wire. Such a construction provides a mesh or grillwork that is flexible about the axis of the stub shafts 27 and 28, but which is substantially inflexible lengthwise. The edges of the mesh engage rods 60 that extend parallel to the sides of the frame members 25 and 26. The rods 60 are preferably clipped to the frame members by spring clips 61 so that the grillwork 30b may easily be removed from the frames 25 and 26 for ease of cleaning. The grillwork 30b removed from the frames 25 and 26, is shown in perspective in FIGURE 9, and a detail of the clip 61 is shown in FIGURE 8a, where the clip is shown holding the rod 60 to the upper rear side of the frame 26.

To hold the frames 25 and 26 in their gripping position, with a continued and positive force exerted upon the food 24, a number of different holding means may be used. It will be appreciated, of course, that the distance between the upper forward side 32 of frame 25 and the lower forward side 40 of frame 26 will be different for different foods. For this reason, the locking means should be adjustable, and the chain 31 forms a convenient and simple adjustable lock. As indicated, one end of the chain 31 is anchored to one of the sides of a frame, and a hook, bifurcated member, or other suitable engaging means 62 is mounted on the opposed side of the other frame. When the food is to be secured in the holder 23, the chain 31 is pulled tight and caught on the engaging means 62. When this is done on both sides of the frame, the food is securely held, and the natural resilience of the frames 25 and 26 as well as the grillwork 30, or the alternate forms of grillwork 30a or 30b, provides a firm but resilient gripping.

In some instances, and particularly where foods of approximately the same size are to be frequently cooked, it may be desirable to use springs to urge the sides of the frames together. When this is done, one end of a spring 63 is anchored to one of the side members of a frame, such as the side 40 of the frame 26, as shown in FIGURE 10. The other end of the spring 63 is provided with a hook that may be slipped over the upper forward side of the frame 25, with a similar form of construction used at the rear of the food holder. While the springs are frequently very convenient, they do have the disadvantage that they cannot have the range of adjustment that a chain can have, and, unless they are kept clean, they can become unpleasant.

Where foods of a similar size are the only item cooked in the improved food holder, as may happen in commercial establishments specializing in chickens, etc., a simpler form of my invention is possible. This form, illustrated in FIGURE 11, has a single frame 25 connected to the stub shafts 27 and 28 for rotation thereby. At the sides of the frame 25 are panels 64 and 65 each formed of a single rod bent in the form of a U, with the open end of the U connected to one side of the frame 25. Between the base of the U and the side of the frame 25 is a grillwork 30c that may be of any of the forms discussed. A similar grillwork extends between the base of the panel 65 and its associated side of the frame 25, and springs 63 are provided to bias each of the panels 64 and 65 to pivot about its associated side of the frame 25, thereby gripping food between the grillworks.

It will be appreciated, of course, that many modifications may be made in the food holder according to the particular requirements that must be met. It will be appreciated, however, that the food holder herein described is fully capable of achieving the objects and securing the advantages heretofore set forth. Consequently, while preferred and modified forms of construction have been shown, I do not wish to be limited to the particular form or arrangement of parts herein described and shown, except as limited by my claims.

I claim:

1. A rotary food holder for cooking food by turning it before a source of heat comprising: a first frame having opposite sides and ends and open in the center to receive food to be gripped therein; a second frame having opposite sides and ends and open in the center to receive food to be gripped therein; means connecting the ends of said first frame to the ends of the said second frame for rotation relative to each other to grip and release food held thereby and for rotation as a unit with food gripped therein, said frames outlining and enclosing a substantially common food receiving space; a first flexible grillwork means connected to and extending between a first side of said first frame and a first side of said second frame; a second flexible grillwork means connected to and extending between a second side of said first frame and a second side of said second frame, said grillwork means being opposed so as to receive an article of food therebetween to be gripped thereby, said grillwork means being freely flexible transversely of the axis of rotation of said frames so that said grillwork means wrap around and conform to the contour of food gripped therebetween as said frames are relatively rotated in the direction to increase the spacing between said first sides and between said second sides and stretch the grillwork means, thereby automatically centering and balancing the food gripped between the grillwork means with respect to the axis of rotation of said frames; and means for urging said frames for relative rotation in the direction toward further separation of said first sides and of said second sides to stretch said grillwork means into tight, gripping engagement with food disposed therebetween.

2. A rotary food holder for cooking food by turning it before a source of heat comprising: a first frame having opposite sides and ends and open in the center to receive food to be gripped therein; a second frame having opposite sides and ends and open in the center to receive food to be gripped therein; means connecting the ends of said first frame to ends of the said second frame for rotation relative to each other to grip and release food held thereby and for rotation as a unit with food gripped therein, said frames outlining and enclosing a substantially common food receiving space; a first flexible grillwork means connected to and extending between a first side of said first frame and a first side of said second frame; a second flexible grillwork means connected to and extending between a second side of said first frame and a second side of said second frame, said grillwork means being opposed so as to receive an article of food therebetween to be gripped thereby, said grillwork means being freely flexible transversely of the axis of rotation of said frames and relatively less flexible longitudinally of said axis of rotation so that said grillwork means wrap around and conform to the contour of food gripped therebetween as said frames are relatively rotated in the direction to increase the spacing between said first sides and between said second sides and stretch the grillwork means, thereby automatically centering and balancing the food gripped between the grillwork means with respect to the axis of rotation of said frames; and means for urging said frames for relative rotation in the direction toward further separation of said first sides and of said second sides to stretch said grillwork means into tight, gripping engagement with food disposed therebetween.

3. A rotary food holder for cooking food by turning it before a source of heat comprising: a first frame having opposite sides and ends and open in the center to receive food to be gripped therein; a second frame having opposite sides and ends and open in the center to receive food to be gripped therein; means connecting the ends of said first frame to the ends of the said second frame for rotation relative to each other to grip and release food held thereby and for rotation as a unit with food gripped therein, said frames outlining and enclosing a substantially common food receiving space; a first flexible grillwork means connected to and extending between a first side of said first frame and a first side of said second frame; a second flexible grillwork means connected to and extending between a second side of said first frame and a second side of said second frame, said grillwork means being opposed so as to receive an article of food therebetween to be gripped thereby, said grillwork means being freely flexible transversely of the axis of rotation of said frames so that said grillwork means wrap around and conform to the contour of food gripped therebetween as said frames are relatively rotated in the direction to increase the spacing between said first sides and between said second sides and stretch the grillwork means, thereby automatically centering and balancing the food gripped between the grillwork means with respect to the axis of rotation of said frames; and means extending between the first side of said first frame and the second side of said second frame and between the second side of the first frame and the first side of the second frame for limiting the spacing between the sides of the frames to which they are connected so as to hold said grillwork means in tight, gripping engagement with food placed therebetween.

4. A rotary food holder for cooking food by turning it before a source of heat comprising: a first frame having opposite sides and ends and open in the center to receive food to be gripped therein; a second frame having opposite sides and ends and open in the center to receive food to be gripped therein; means connecting the ends of said first frame to the ends of the said second frame for rotation relative to each other to grip and release food held thereby and for rotation as a unit with food gripped therein, said frames outlining and enclosing a substantially common food receiving space; a first flexible grillwork means connected to and extending between a first side of said first frame and a first side of said second frame; a second flexible grillwork means connected to and extending between a second side of said first frame and a second side of said second frame, said grillwork means being opposed so as to receive an article of food therebetween to be gripped thereby, said grillwork means being freely flexible transversely of the axis of rotation of said frames so that said grillwork means wrap around and conform to the contour of food gripped therebetween as said frames are relatively rotated in the direction to increase the spacing between said first sides and between said second sides and stretch the grillwork means, thereby automatically centering and balancing the food gripped between the grillwork means with respect to the axis of rotation of said frames; a first restraining means operable to limit movement of said first side of said first frame away from said second side of said second frame; and a second restraining means operable to limit movement of said first side of said second frame away from said second side of said first frame, said restraining means cooperating to retain said frames with said grillwork means in tight, gripping engagement with food disposed therebetween.

5. A rotary food holder for cooking food by turning it before a source of heat comprising: a first frame having opposite sides and ends and open in the center to receive food to be gripped therein; a second frame having opposite sides and ends and open in the center to receive food to be gripped therein; coaxial stub shafts attached to the opposite ends of said first frame and projecting outwardly therefrom to engage stationary bearing surfaces to directly support and rotate said first frame with said stub shafts; means mounting said second frame solely on said stub shafts for rotation relative to said first frame to grip and release food held therein and for rotation as a unit with said first frame upon said stub shafts, said frames outlining and enclosing a substantially common food receiving space; a first flexible grillwork means connected to and extending between a first side of said first frame and a first side of said second frame; a second flexible grillwork means connected to and extending between a second side of said first frame and a second side of said second frame, said grillwork means being oppostd so as to receive an article of food therebetween to be gripped thereby, said grillwork means being freely flexible transversely of the axis of rotation of said frames so that said grillwork means wrap around and conform to the contour of food gripped therebetween as said frames are relatively rotated in the direction to increase the spacing between said first sides and between said second sides and stretch the grillwork means, thereby automatically centering and balancing the food gripped between the grillwork means with respect to the axis of rotation of said frames; and restraining means for holding said frames against relative rotation in the direction toward decreased separation of said first sides and of said second sides to hold said grillwork means stretched in tight, gripping engagement with food disposed therebetween.

6. A rotary food holder for cooking food by turning it before a source of heat comprising: a first frame having opposite sides and ends and open in the center to receive food to be gripped therein; a second frame having opposite sides and ends and open in the center to receive food to be gripped therein; coaxial stub shafts attached to the opposite ends of said first frame and projecting both outwardly and inwardly thereof, the outwardly extending portions of said stub shafts engaging stationary bearing surfaces to directly support and rotate said first frame with said stub shafts; means mounting the opposite ends of said second frame on the inwardly extending portions of said stub shafts to provide for relative rotation of said frames about the axis of said stub shafts to grip and release food held therein and for rotation of said frames as a unit with food gripped therein, the mounting means for said second frame providing for release of said second frame from the stub shafts by relative bending of the adjacent ends of said first and second frames, said frames outlining and enclosing a substantially common food receiving space; a first flexible grillwork means connected to and extending between a first side of said first frame and a first side of said second frame; a second flexible grillwork means connected to and extending between a second side of said first frame and a second side of said second frame, said grillwork means being opposed so as to receive an article of food therebetween to be gripped thereby, said grillwork means being freely flexible transversely of the axis of rotation of said frames so that said grillwork means wrap around and conform to the contour of food gripped therebetween as said frames are relatively rotated in the direction to increase the spacing between said first sides and between said second sides and stretch the grillwork means, thereby automatically centering and balancing the food gripped between the grillwork means with respect to the axis of rotation of said frames; a first restraining means operable to limit movement of said first side of said first frame away from said second side of said second frame; and a second restraining means operable to limit movement of said first side of said second frame away from said second side of said first frame, said restraining means cooperating to retain said frames with said grillwork means in tight, gripping engagement with food disposed therebetween.

References Cited in the file of this patent

UNITED STATES PATENTS

| | | |
|---|---|---|
| 38,018 | Dick | Mar. 24, 1813 |
| 84,758 | Phelps | Dec. 8, 1868 |
| 870,118 | Miller | Nov. 5, 1907 |
| 2,297,332 | Stewart | Sept. 27, 1942 |
| 2,320,304 | Rosset | May 25, 1943 |
| 2,638,841 | Boyce | May 1, 1953 |
| 2,703,046 | Ahlquist | Mar. 1, 1955 |
| 2,747,497 | Brown | May 29, 1956 |